United States Patent [19]

Wolstoncroft

[11] Patent Number: 4,592,934

[45] Date of Patent: Jun. 3, 1986

[54] METHOD OF PREPARING AND PACKAGING AUTOMOBILE WAX

[75] Inventor: Richard L. Wolstoncroft, Mt. Kisco, N.Y.

[73] Assignee: Union Carbide Corporation, Danbury, Conn.

[21] Appl. No.: 667,896

[22] Filed: Nov. 2, 1984

[51] Int. Cl.$^4$ ............................ B05D 3/12; C09G 1/08
[52] U.S. Cl. ........................................ 427/355; 106/3; 106/10; 106/11; 252/309; 427/369; 524/906
[58] Field of Search ................ 106/3, 10, 11; 252/309, 252/314; 427/355, 369

[56] References Cited

U.S. PATENT DOCUMENTS

| | | | |
|---|---|---|---|
| 3,393,078 | 7/1968 | Lockhart et al. | 106/8 |
| 3,395,028 | 7/1968 | Mackles | 106/8 |
| 3,544,498 | 12/1970 | Holdstock et al. | 106/3 |
| 3,836,371 | 9/1974 | Kokoszka | 106/10 |
| 3,847,622 | 11/1974 | Brandl et al. | 106/10 |
| 3,960,575 | 6/1976 | Martin | 106/10 |
| 4,013,475 | 3/1977 | Liebowitz et al. | 106/10 |
| 4,398,953 | 8/1983 | Van der Linde | 106/10 |

OTHER PUBLICATIONS

Chem. Abst. 89: 22, 519r, 1978.

*Primary Examiner*—Theodore Morris
*Attorney, Agent, or Firm*—James C. Arvantes, Dominic J. Terminello and Marylin Klosty

[57] ABSTRACT

Multi-phase paste and liquid polish compositions having improved gloss life and water resistance durability are obtained by providing an oil external emulsion phase containing aminofunctional polysiloxane, and a water external emulsion phase containing dimethyl polysiloxane. The oil external emulsion phase and the water external emulsion phase are packaged in the same container or in separate containers in a manner as to keep each phase separate from the other phase until the polish compositions are applied to a surface to be polished. The method of preparing and packaging the multi-phase polish compositions is also disclosed.

69 Claims, 4 Drawing Figures

AVERAGE EVALUATOR RATINGS VS. CLEAN PAINT (CLEANED-ONLY CONTROLS)
GLOSS

METHOD OF PREPARING AND PACKAGING AUTOMOBILE WAX

BACKGROUND OF THE INVENTION

This invention relates to an improved method of preparing and packaging automobile wax compositions which provides heretofore desired concentrations of durable components and advantages in application and performance. Heretofore, automobile wax composition preparations were based on a number of compromises. Due in part to desired performance characteristics, some wax compositions are easy to apply and rub-off, but do not provide high gloss or extended water beading. Other wax compositions may be difficult to apply and rub-off, but provide durability for extended periods of time. Durability is generally measured by the user in terms of finish appearance and water beading properties.

In formulating automobile wax compositions, some of the more common ingredients include abrasives, solvents, emulsifiers, waxes, and silicones. Each ingredient serves a particular function or purpose therein. For example, abrasives serve to clean, smooth, and remove oxidized paint and old wax films. Solvents are present for cleaning and dissolving road tar and oily soils, and also serve to dissolve active ingredients such as waxes and silicones into the polish composition. Emulsifiers are employed for cleaning insects and general dirt contaminations, as well as providing product stability.

In addition, automobile wax compositions contain hard waxes and soft waxes. Hard waxes, such as carnauba wax, have a high melting point and thus make the polish film quite glossy and durable. However, application is difficult since hard waxes do not spread and buff easily. Soft waxes are easier to apply and buff, but gloss is less desirable as well as water beading durability. To provide extended water beading durability, artisans have found that a variety of silicone materials will serve this desired function. In addition, other silicones provide improved ease of application, easier buffing, and deeper, and extended polish gloss.

A variety of silicones have been employed in polish formulations, and generally include polydimethyl siloxanes or linear dimethyl silicone oils, and aminofunctional polysiloxanes. The dimethyl silicone oils generally provide ease of application and desirable gloss but are less durable. By the same token, the aminofunctional silicone oils are more durable and provide extended water beading properties to automobile polishes, but tend to be difficult to apply and remove during use due to their rubbery or gummy nature. When used in high concentrations in water external emulsion polishes, the aminofunctional silicone oils cause usage problems in removing dried powder residue from the automobile surface. Oil external emulsions containing high concentrations of aminofunctional silicones produce dried films which are easier to remove from the automobile surface, but are difficult to apply.

In addition, water external emulsion polishes of typical compositions generally produce higher gloss finishes and better cleaning than oil external polishes having similar compositions. Further, pursuant to the prior art, when aminofunctional silicone oils and dimethyl silicone oils are combined during preparation of the polish compositions, it has been found that they dissolve in each other thereby contaminating each other, and thus reduce their respective performances. Accordingly, it would be desirable to isolate the aminofunctional silicone oils from the dimethyl silicone oils until use of the polish composition to obtain maximum performance from these ingredients.

SUMMARY OF THE INVENTION

In accordance with the instant invention, there is provided a multi-phase polish composition wherein one phase of the polish composition comprises an oil external emulsion containing at least one aminofunctional silicone oil, and one phase of the polish composition comprises a water external emulsion containing at least one dimethyl silicone oil. The multi-phase polish composition may be packaged in the same container or in more than one container, but remains separate until the polish is applied to a hard surface such as the painted areas of an automobile. Accordingly, the oil external emulsion phase provides polish durability as evidenced by long-lasting water beading characteristics, and also easy wipe-off properties to the polish compositions, while the water external emulsion phase provides easy application and good cleaning properties to the polish composition.

DETAILED DESCRIPTION OF THE INVENTION

Figure 1:
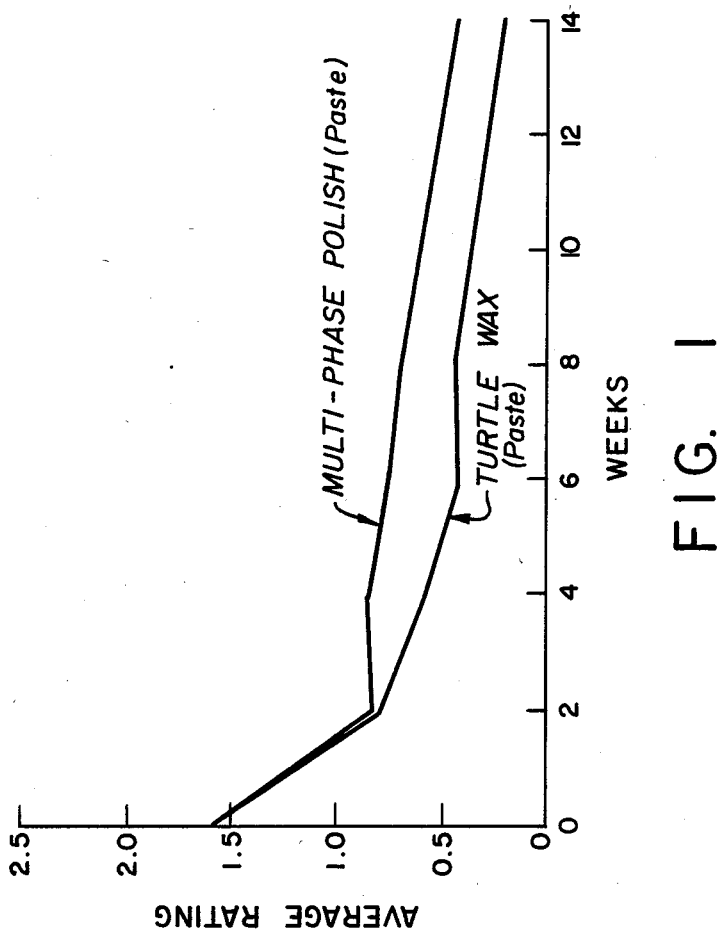
FIG. 1 is a graphic representation of the improved gloss ratings of a polish composition of the present invention compared with the prior art.

It has been found that a polish composition exhibits improved durability when aminofunctional silicone oils are processed with a minimum of wax present and without the less durable dimethyl silicone oils present which dilute the more durable aminofunctional silicone oils thereby reducing the water beading properties of the polish composition. Such is accomplished by preparing an oil external emulsion phase containing at least one aminofunctional silicone oil. The dimethyl silicone oil component necessary for ease of use is processed separately by incorporating it in a water external emulsion phase which provides good application properties to the polish composition. The oil external emulsion phase and the water external emulsion phase are then packaged in a container or in two separate containers in a manner such that the emulsion phases remain separate from each other until use as when applied to a surface such as an automobile. Pursuant to this invention, all, or a major proportion of the durable aminofunctional silicones is concentrated in one phase, undiluted by the less durable dimethyl silicones. The other phase contains the dimethyl silicones which, being separate, more efficiently provide ease of use and higher gloss to the multi-phase polish composition. The multi-phase polish composition in accordance with this invention provides a higher ratio of durable silicones to non-durable silicones than is found in a one-phase polish composition. A one-phase polish composition containing a high concentration, e.g., about 6 weight percent, of durable aminofunctional silicone oil would normally not be usable by itself. However, the multi-phase portion containing the dimethyl silicone oil provides acceptable application properties to the polish composition.

More specifically, one phase of the multi-phase composition of this invention comprises an oil external emulsion containing wax, aminofunctional silicone oil, finely-divided abrasive, petroleum distillate, water, emulsifier, stabilizer, and preservative. The other phase of the multi-phase polish composition of this invention comprises a water external emulsion containing dimethyl polysiloxane, wax, finely-divided abrasive, organic solvent, water, and emulsifier.

The oil external emulsion phase of this invention may comprise from between about 1 and about 10 percent by weight of wax, from between about 2 and about 12 percent by weight of aminofunctional silicone oil, from between about 5 and about 30 percent by weight of abrasive, from between about 10 and about 35 percent by weight of petroleum hydrocarbon distillate, from between about 30 and about 75 percent by weight of water, from between about 0.2 and about 6 percent by weight of emulsifier, from between about 0.1 and about 10 percent by weight of stabilizer, and from between about 0.1 and about 1 percent by weight of preservative. In the foregoing composition, the wax provides uniformity of polish film appearance and aids in the durability of the polish film. The aminofunctional silicone oil bonds the polish film to the automobile surface thus providing long lasting water beading durability. The abrasive provides a polishing effect to the polished surface by smoothing the surface and removing soil therefrom not otherwise removed by ordinary cleaning such as washing. Likewise, the petroleum hydrocarbon distillate further aids cleaning and soil removal from the polished surface. The emulsifier also aids cleaning, but primarily keeps the composition emulsified and homogeneous.

Further, in the oil external emulsion phase composition, the wax component preferably comprises from between about 1 and about 1.5 percent by weight of a partially saponified, oxidized hydrocarbon wax, and from between about 0.5 and about 1 percent by weight of an oxidized microcrystalline hydrocarbon wax, based on the weight of the oil external emulsion phase composition. The aminofunctional silicone oil component preferably comprises from between about 1 and about 3 percent by weight of a liquid aminofunctional polysiloxane having a viscosity at 25° C. of from about 10 to about 200 centistokes, preferably from about 20 to about 50 centistokes; and from between about 4 and about 24 percent by weight of a liquid 50 percent by weight aminofunctional polysiloxane solution having a viscosity at 25° C. of from about 100 to about 5,000 centistokes, preferably from about 250 to about 1000 centistokes. The abrasive material in the oil external emulsion phase composition may be selected from silica, diatomaceous earth, kaolin clay, aluminum silicate, and mixtures thereof, or other known mild abrasives which are not harmful to the surface to be polished. The petroleum hydrocarbon distillate may be selected from volatile aliphatic hydrocarbon liquids such as kerosene, having a minimum boiling point of about 300° F. The emulsifier is present to also facilitate the formation of the emulsion and provide the composition with storage stability. The emulsifier preferably comprises a fatty acid material such as sorbitan monostearate, sorbitan monooleate, stearylamine acetate, or mixtures thereof. The stabilizer may be a 1,2 ethanediol such as ethylene glycol, and the preservative may be formaldehyde, formalin, or a mixture of an amine and 1,2 benzisothiazolin 3-one. In addition, pigments and aromatic oils may optionally be present, if desired, in amounts that do not affect the functional properties of the polish composition.

The water external emulsion phase of the multi-phase polish composition of this invention may comprise from between about 0.1 and about 10 percent by weight of wax, from between about 0.5 and about 15.0 percent by weight of dimethyl polysiloxane, from between about 3 and about 30 percent by weight of abrasive, from between about 0.1 and about 60 percent by weight of organic solvent, from between about 15 and about 95 percent by weight of water, and from between about 0.3 and about 5 percent by weight of emulsifier. As in the oil external emulsion phase composition, the wax, abrasive, solvent, water, and emulsifier serve similar functions herein. However, the dimethyl polysiloxane enhances the gloss of the polished surface, and also provides easy application of the polish composition and removal of the dried polish film.

Further, in the water external emulsion phase of the polish composition of this invention, the wax component preferably comprises from between about 0.5 and about 3 percent by weight of paraffin wax having a melting point of about 130° F., and from between about 1 and about 10 percent by weight of a montan wax or combination of oxidized montan waxes. The montan wax may also contain ester groups resulting from the esterification of at least part of the acid groups of the wax, for example, with a polyhydric alcohol or a $C_{16}$ to $C_{30}$ monohydric alcohol. The dimethyl polysiloxane component preferably comprises from between about 2 and about 12 percent by weight of a silicone fluid or a mixture of silicone fluids having a viscosity at 25° C. of from about 100 to about 30,000 centistokes, preferably about 1000 centistokes. The abrasive material herein may be selected from amorphous silica, diatomaceous earth, aluminum silicate, kaolin clay, and mixtures thereof, or other known mild abrasives which do not harm the surface to be polished. The organic solvent may be a volatile aliphatic hydrocarbon liquid such as kerosene, but is preferably selected from mineral spirits having a Kauri-Butanol value of between about 30 and about 35. The emulsifier preferably comprises the product of the in-situ reaction between an alkaline liquid such as morpholine and a fatty acid material such as oleic acid having an acid value of about 200. Further, in that the dimethyl polysiloxanes and the aminofunctional polysiloxanes are processed separately and provide benefits to ease of use, gloss and durability to the multiphase polish composition, the same emulsion type, e.g., water external or oil external, may be employed for both portions of the multi-phase composition, it being understood that each polish phase while being the same emulsion type, would differ in composition.

In the best mode of this invention, the oil external emulsion phase of the multi-phase polish composition involves the preparation of a water phase composition and the preparation of an oil phase composition as follows. In the preparation of the water phase composition, to a clean tank equipped with a variable speed agitator, preferably made of stainless steel, fitted with a steam jacket, is added the water and sufficient agitation is provided to assure constant movement of the product. Heating of the contents of the tank is initiated. The stabilizer is added to the tank, and mixing and heating continued to 185° F. A fatty acid material such as stearylamine acetate, and a mixture of an amine and 1,2 benzisothiazolin 3-one are added to the tank and completely dissolved in the contents of the tank.

The oil phase composition of the oil external emulsion is also prepared in a clean stainless steel tank equipped with a variable speed agitator and fitted with a steam jacket. The petroleum hydrocarbon distillate is added first to the tank and sufficient agitation is provided to assure constant movement of the product. Heating of the tank contents is initiated. An abrasive material is slowly added to the tank to assure even dispersion, followed by an oxidized microcrystalline, hydrocarbon wax, and then by a partially saponified, oxidized hydrocarbon wax. Heating is continued to a temperature of about 200° F. and the tank contents maintained at that temperature for about 20 minutes or until the wax materials are melted. While maintaining the temperature of the preparation at about 200° F., an aminofunctional polysiloxane having a viscosity at 25° C. of between 250 and 1,000 centistokes is added to the tank contents, followed by an aminofunctional polysiloxane 50 wt. % solution in mineral oil having a viscosity at 25° C. of between 20 to 50 centistokes. An abrasive material is then slowly added to the tank contents to avoid lumping and over-cooling of the mixture. The temperature of the tank contents is maintained at about 200° F. for about ten minutes. Further abrasive material is slowly added to the tank contents while maintaining the temperature of the tank contents at about 200° F. Then, a sorbitan monostearate is added to the tank contents, followed by the addition of a sorbitan monooleate. The temperature of this tank contents is increased to about 205° F. and maintained at that temperature for about 20 minutes.

The next step is to produce the oil external emulsion phase by adding the water phase preparation to the oil phase preparation. At this time, the agitator in the oil phase preparation tank must be at a speed sufficient to stir the contents, and the contents should be at a temperature of about 205° F. The agitator in the water phase preparation tank must be at a speed sufficient to stir the contents, and the contents should be at a temperature of about 185° F. The contents of the water phase preparation tank are then rapidly added to the contents of the oil phase preparation tank, and agitation continued to provide thorough mixing for about 20 minutes. Agitator speed is then reduced to maintain slight movement of the product, and the product cooled to about 150° F. at which time a pigment may be added thereto. When the product has cooled to about 145° F., the morpholine and preservative are added to it and mixed therewith. At a temperature of about 140° F., an aromatic oil may be added to the product, if desired. Finally, when the product has cooled to a temperature of about 137° F., the product may be homogenized through a conventional homogenizer, and collected in a preheated holding tank maintained at a temperature of about 130° F.

Likewise, in the best mode of this invention, the water external emulsion phase of the multi-phase polish composition involves the preparation of an oil phase composition and the preparation of a water phase composition. The oil phase composition is prepared in a clean, stainless steel tank equipped with a variable speed agitator and fitted with a steam jacket. In the following order is added to the tank the organic solvent, the dimethyl polysiloxane or mixture of dimethyl polysiloxanes, the montan wax, and the paraffin wax. The mixture is agitated and heated to a temperature of about 195° F. and maintained at that temperature for about 15 minutes. The mixture is then cooled to about 170° F. and maintained at that temperature. The oleic acid is added to the mixture about 20 minutes prior to emulsification.

The water phase composition is prepared in a tank as described above by adding thereto in order, the water, and the abrasive material. The mixture is agitated and heated to a temperature of about 120° F. The morpholine is added to the mixture about 20 minutes prior to emulsification.

In the emulsification step, the oil phase composition is slowly added to the water phase composition with agitation and the temperature of the emulsion adjusted to about 140° F. An aromatic oil or perfume may, if desired, be added to the mixture and the mixture then cooled to about 135° F.

The oil external emulsion phase and the water external emulsion phase may then be loaded simultaneously into a single container or into separate containers. When a series of containers are filled, they may be conveyed through a cooling tunnel to cool to room temperature whereby the container contents become solidified. In one mode of this invention, the multi-phase polish composition is packaged together in the same container, but each phase remains separated from the other phase until the polish is applied to a surface to be polished such as an automobile. The oil external emulsion phase and the water external emulsion phase may be kept separate in the container by adding the phases in consecutive layers to the container, by adding one of the phases to the container in a criss-cross pattern with respect to the other phase, or by adding the phases to the container in adjacent layers.

In another embodiment of this invention, multi-phase liquid polish compositions may be provided employing the aforementioned compositions and manufacturing procedures to obtain water beading properties which are equal to or better than those obtained with the multi-phase paste polish compositions herein. Likewise, multi-phase liquid polish compositions may be provided having much better gloss properties than those obtained with the instant multi-phase paste polish compositions. However, when preparing the multi-phase liquid polish compositions of the invention, the wax content and the acid number of the wax should be reduced in the water external emulsion phase. Likewise, the wax content may be reduced and the solvent content increased in preparing the oil external emulsion phase. Further, the multi-phase liquid polish compositions should be packaged in separate containers and combined just prior to or during use. By the multi-phase polish composition of this invention, polish durability is substantially improved over conventional polish compositions as evidenced by longer lasting water beading properties and gloss. Such is provided by concentrating large amounts of the durable aminofunctional silicones in one phase, undiluted by the less durable dimethyl silicones. The other phase containing dimethyl silicones, which being separate, can more efficiently provide ease of use and gloss.

The invention will be further understood by the following examples wherein the quantities shown are percentage weights, based on the weight of all constituents combined, unless otherwise indicated.

EXAMPLE I

A multi-phase paste polish composition in accordance with this invention was prepared as follows. The oil external emulsion phase was prepared from the following ingredients:

| Oil External Emulsion Phase | | |
|---|---|---|
| Ingredient | | %/Weight |
| (A) | Aliphatic hydrocarbon | 16.0 |
| (B) | Abrasive | 3.0 |
| (C) | Oxidized, microcrystalline wax | 0.7 |
| (D) | Partially saponified, oxidized hydrocarbon wax | 1.3 |
| (E) | Aminofunctional polysiloxane | 2.0 |
| (F) | Aminofunctional polysiloxane (aliphatic hydrocarbon solution, 50% active) | 12.0 |
| (G) | Abrasive | 3.0 |
| (H) | Abrasive | 8.0 |
| (I) | Sorbitan monostearate | 0.2 |
| (J) | Sorbitan monooleate | 0.2 |
| (K) | Soft water | 49.5 |
| (L) | Stearylamine acetate | 0.6 |
| (M) | Ethylene glycol | 3.0 |
| (N) | 30% amine solution of 1,2 benzisothiazolin 3-one | 0.1 |
| (O) | Morpholine | 0.1 |
| (P) | Formalin | 0.1 |
| (Q) | Pigment | 0.1 |
| (R) | Aromatic Oil | 0.1 |
| | | 100.00 |

Two containers equipped with variable speed agitators and suitable for use with a heating device such as a laboratory hot plate were employed to make the water phase preparation and the oil phase preparation, respectively, of the oil external emulsion phase. The water phase preparation was made by adding ingredient K to one container. Agitation was started and heating initiated. To this container was added ingredient M, agitation continued, and the mixture heated to 185° C. Ingredients L and N were added to the mixture and allowed to dissolve before emulsification with the oil phase preparation. The oil phase preparation was prepared by adding ingredient A to the other container. Heating was initiated and agitation was started. Ingredients B, C and D were added to the mixture in the recited order. Heating was continued to 200° F., and the mixture kept at that temperature until the ingredients were dissolved or dispersed. Then, in the recited order, ingredients F, E and G were added to this mixture while maintaining the mixture at about 200° F. Ingredients H, I and J were added to the mixture in the recited order and the temperature of the mixture was increased to about 205° F. until the ingredients were dissolved or dispersed.

In the emulsification step, the water phase preparation at 185° F. was rapidly added to the oil phase preparation maintained at 205° F. with good agitation. Agitator speed was reduced to maintain slight product movement at the periphery of the container and the batch cooled to 150° F. at which time ingredient Q was added thereto. When the batch was cooled to 145° C., ingredients O and P were added to it. At 140° F., ingredient R was added to the batch. The batch was maintained at a temperature of 130° F. The batch may be homogenized if increased stability is desired.

A water external emulsion phase was prepared from the following ingredients:

| Water External Emulsion Phase | | |
|---|---|---|
| Ingredient | | %/Weight |
| (A-1) | Petroleum hydrocarbon distillate | 40.0 |
| (B-1) | Dimethyl polysiloxane, low viscosity | 5.9 |
| (C-1) | Dimethyl polysiloxane, high viscosity | 2.1 |
| (D-1) | Montan wax | 5.5 |
| (E-1) | Paraffin wax | 1.0 |
| (F-1) | Oleic acid | 1.2 |
| (G-1) | Soft water | 25.97 |
| (H-1) | Abrasive | 15.0 |
| (I-1) | Abrasive | 2.0 |
| (J-1) | Morpholine | 1.2 |
| (K-1) | Perfume | 0.1 |
| (L-1) | Pigment | 0.03 |
| | | 100.00 |

Two containers equipped with variable speed agitators and suitable for use with a heating device such as a hot plate were employed to make the oil phase preparation and the water phase preparation, respectively, of the water external emulsion phase. The oil phase preparation was made by adding, in order, ingredients A-1, B-1, C-1, D-1 and E-1 to one container, mixing, heating to 195° F., and maintaining this temperature for about 15 minutes. The preparation was cooled to 170° F. and maintained at that temperature. Ingredient F-1 was added to the mixture with agitation immediately before emulsification with the water phase preparation. The water phase preparation was made by adding to the other container, in order, ingredients G-1, H-1 and I-1 with agitation and heating to 120° F. Ingredient J-1 was added to the mixture with agitation immediately before emulsification with the oil phase preparation.

For the emulsification step, the oil phase preparation was added to the water phase preparation with agitation, and the temperature of the emulsion adusted to 140° F. Ingredients K-1 and L-1 were added to and mixed with the emulsion which was then cooled to 135° F.

The multi-phase polish composition was then obtained by feeding the oil external emulsion phase and the water external emulsion phase into four quadrants of a container in a manner as to keep each phase separated from the other, and a series of filled containers conveyed through a cooling tunnel. After passing through the cooling tunnel, the product in each container was at room temperature, and the containers were sealed. This product was designated Product X.

A multi-phase paste polish product designated Product T was prepared from the foregoing oil external emulsion phase formulation and the foregoing water external emulsion phase formulation with one exception thereto. That is, in the water external emulsion phase formulation the water content therein was reduced from 25.97 percent by weight to 22.64 percent by weight, and a proprietary aqueous suspension of tetrafluoroethylene containing about 60 percent by weight active material available as Teflon 30B from E. I. DuPont Co. Wilmington, Del. was added to the forumlation in the amount of 3.33 percent by weight. This product, Product T, was prepared following the procedure for Product X except that the tetrafluoroethylene material was added to the water external emulsion phase formulation just prior to the addition of ingredient J-1, the morpholine.

EXAMPLE II

The products obtained in Example I were evaluated against a commercial paste polish composition available from Turtle Wax Company, Chicago, Ill. under the tradename Turtle Wax ® Improved Super Hard Shell Car Wax, stock no. 223, for ease of application, ease of rub-off, water beading retention, gloss, and polish life. Turtle Wax Improved Super Hard Shell Car Wax (Turtle Wax Paste) is believed to be a single phase, water extendable paste wax which is a recognized leader in the field of automotive wax products. The comparative evaluation was conducted in the State of New York during the months of July, August, September, October and November, 1983 on fifteen automobiles. Data was accumulated at the start of the comparative evaluation, and at two week intervals for 10 weeks, and at the end of 14 weeks. Each paste polish product was evaluated on each automobile. The evaluations were conducted on the mainly horizontal surfaces of the automobiles because experience has shown that exposure to sunlight, rain, and atmospheric fallout causes more severe weathering on these horizontal surfaces. In addition, gloss and water beading are normally determined by observation of the horizontal surfaces of automobiles.

The automobiles employed in the comparative evaluation were selected to represent a variety of manufacturers, ages, colors, and paint conditions. Both metallic and non-metallic paints were included in the evaluation. All automobiles were used to commute to and from the owner's place of employment. Seven of the automobiles were not garaged during the night. The test automobiles ranged in age from 1975 to 1983 models as shown below in Table 1.

TABLE 1

Paste Polish Compositions Test Automobiles

| Model | Year | Color | Paint Type | Garaged | Initial Finish Condition | Odometer Reading |
|---|---|---|---|---|---|---|
| Ford Fairmont | 1978 | Red | non-metallic | yes | Very dull and oxidized | 46211 |
| Chevrolet Malibu | 1979 | Dk Blue | metallic | no | Moderately dull and oxidized | 37005 |
| Chevrolet Malibu | 1977 | Lt Brown | metallic | yes | Very dull and oxidized | 78378 |
| Datsun 210 | 1979 | Lt Blue | metallic | yes | Slightly dull and oxidized | 30891 |
| Chevrolet Caprice | 1978 | Gold | metallic | no | Moderately dull and oxidized | 59045 |
| Chevrolet Citation | 1980 | Dk Blue | metallic | yes | Very dull and oxidized | 30452 |
| Buick Skylark | 1978 | Maroon | metallic | yes | Very dull and oxidized | 32407 |
| Plymouth Valiant | 1975 | Lt Green | metallic | no | Slightly dull and oxidized | 59774 |
| Plymouth Horizon | 1979 | Orange | non-metallic | no | Very dull and oxidized | 68187 |
| Ford Pinto | 1976 | Yellow | non-metallic | no | Moderately dull and oxidized | 70066 |
| Toyota Corona | 1981 | White | non-metallic | no | Moderately dull and oxidized | 84182 |
| Renault Alliance | 1983 | Red | metallic | yes | Slightly dull and oxidized | 7433 |
| Chevrolet Citation | 1980 | Rust | metallic | yes | Slightly dull and oxidized | 27979 |
| Mercury Monarch | 1978 | Red | non-metallic | yes | Moderately dull and oxidized | 49784 |
| Dodge Aspen | 1980 | Brown | metallic | no | Very dull and oxidized | 44795 |

Test Polish Composition Application Procedure

Immediately before application of the test paste polish products, each test automobile was hand washed with Simoniz Car Wash, available from Union Carbide Corporation, Danbury, Ct., following label directions. After rinsing with clear water, each test automobile was hand dried with a synthetic chamois. The test automobiles were washed and dried in the same manner immediately before each subsequent evaluation. The test automobiles were again washed at each evaluation interval during the test period.

The test paste polish products were applied to the test automobiles in an array utilizing a partially balanced, incomplete block design. The test polish products were situated so observers compared only two, unidentified polish test areas at one time. That is, each test automobile became a single replicate of the partially balanced, incomplete block designs for four treatments in sets of three. The patterns on the test automobiles were chosen as the three permutations of four items in a square array. Scoring was based on side by side comparisons of the test areas. This evaluation system permits each polish to be compared directly to a cleaned-only control area. When the test polishes were applied, one-inch masking tape was used to separate the test polish areas. Cleaned-only control areas were cleaned using Simoniz ® Superpoly 10 Minute Prewax/Prepoly Cleaner available from Union Carbide Corporation, Danbury, Ct. This product contains no silicone and no wax, and cleans the automobile surfaces, while removing weathered paint without depositing a polish film. The test paste polishes were applied to the test areas without recleaning since they contain sufficient cleaning agents to clean most car finishes to a good condition. Each test polish was applied to each car, and each test polish was arrayed with a cleaned-only control area. The Turtle Wax Paste product was applied to the test automobiles according to directions printed on its container. The multi-phase paste polish compositions prepared in Example I were applied to the test automobiles in a shaded area. If the automobile finish was in a badly faded or oxidized condition, it was precleaned with Simoniz ® New Look Finish Restorer available from Union Carbide Corporation, Danbury, Ct. A polish applicator was lightly rotated in the multi-phase polish compositions and applied sparingly to a small section of the automobiles, using a circular motion. The polish compositions were allowed to dry to a haze, and then buffed lightly using a clean, soft cloth to an even gloss. The cloth was turned frequently to prevent smearing.

The test paste polishes were easy to apply to all the test automobiles. The test polishes were also easy to remove from, i.e., rub-off, all the test automobiles. It was found that the test polishes cleaned and improved the appearance of all of the test automobile finishes, and all the polished areas were more shiny than the unpolished surrounding areas.

Rating System

Car polish films are primarily destroyed by attrition due to weathering. Such is evidenced by reduction of gloss and water beading as seen on automobiles in normal use. Therefore, the polish life on an automobile can be determined by comparing a polished area on an automobile with a cleaned-only control area thereon. Polish life is exhausted when gloss and water beading of the polished area are no longer noticeably different from the cleaned-only control areas. High gloss is considered to be a condition where the surface is very reflective (mirror-like) as opposed to dull. High gloss from an automobile polish is often accompanied by an intensification of color known as "jetness". Water beading is a function of the hydrophobic nature of an automobile paint surface. A water droplet on a hydrophobic surface such as one freshly polished will show a high contact angle, and the water droplet will be small, uniform, and spherical in shape. As weathering destroys the polish film, it reduces the water beading characteristics of the film. As water beading is reduced, the automobile surface becomes less hydrophobic, the water beads become larger and flatter in appearance, and the water beads eventually tend to "sheet" or flatten out.

Trained observers were used to evaluate all test areas on all the test automobiles using an evaluation form containing instructions. The evaluation form allows the observers to rate each test section by close visual inspection and to make a comparison of that section with the one next to it. If the areas are equal they are rated as such. If one section is noticeably better than the area next to it a rating of 1 is assigned to the better area. If the areas differ by a substantial amount, a rating of 2 is given to the better area. First gloss was rated. Then the car was sprayed with water to simulate rain and water beading characteristics were evaluated. Three trained observers were used in each rating session. The observers were unaware of which areas were cleaned-only controls or which were polished with a test polish. Nor were they made aware of the positioning of the test polishes. At the end of each inspection period, the raw observer data is collected. Analysis of this data allows the polishes to be compared to the "clean paint" control or to each other.

This test consists of three blinded observers rating the test polish pairs on fifteen cars at each evaluation period. Not all cars were available for each evaluation. This is because fourteen of the fifteen cars were privately owned, privately driven and taken on vacations. One car was owned by Union Carbide Corp. It was not always available since it was driven on extended trips. However, most of the cars on test were evaluated at each period. The test polishes were scored as follows:

|  |  | Score |
|---|---|---|
| A. | As compared to the cleaned-only control area | |
|  | Equal to control | 0 |
|  | Better than control | 1 |
|  | Much better than control | 2 |
| B. | As compared to each other Multi-phase compositions | |
|  | (1) better than Turtle Wax | 1 |
|  | (2) equal to Turtle Wax | 0 |
|  | (3) worse than Turtle Wax | −1 |

The data obtained in this test was analyzed by standard t-tests to determine differences at a 95% confidence level. The t-tests may be found in National Bureau of Standards Handbook 91, Chapter 3, at pages 3-31, 3-32, and 3-34. Statistical analyses of the data at a 95% confidence level show that the test polish areas throughout the fourteen week test period were better in gloss and water beading than the cleaned-only control areas. The evaluator data for each polish area compared to the cleaned-only control area for each time period and each property, i.e., gloss or water beading, as part of the statistical analysis ratings are averaged. In this regard, the maximum possible average evaluator rating in the test is 2.7. This is because the observers were asked to indicate as may as two degrees of superiority of one test area over another. The average observer ratings were derived by totalling the evaluator scores algebraically and dividing the sum by the number of observations per time period per property. From experience, an average evaluator rating for a polish area compared to a cleaned-only control area above 0.5 shows a reasonable difference between the polishes being compared or between a polish area and a cleaned-only control area. A rating below 0.5 indicates little difference or benefit. Thus, ratings below 0.5 show that the polish is obviously weathered. Such polished areas are distinguishable from cleaned-only control areas only by very close observation which cannot be related to any benefit for the polish user.

Statistical analyses at a 95% confidence level were also made of the direct comparison of the multi-phased polish compositions herein versus the Turtle Wax Paste. The average evaluator gloss ratings for the multi-phase paste polish composition Product X and the Turtle Wax paste polish are shown in graphic form in FIG. 1. It can be seen from FIG. 1 that the average evaluator gloss ratings for the multi-phase polish composition were above 0.5 through the twelve week test period, thus indicating that this polish composition has a useful polish gloss life in excess of twelve weeks. In comparison, it can also be seen from FIG. 1 that the average evaluator gloss ratings for Turtle Wax fall below 0.5 prior to the six week test period, and remain below 0.5 throughout the rest of the fourteen week test period. Thus, it may be concluded from the foregoing test results that the multi-phase paste polish composition has a useful gloss life in excess of twelve weeks, whereas Turtle Wax paste has a useful polish gloss life of less than six weeks, or a useful gloss life twice as long as the Turtle Wax product. It can also be seen from FIG. 1 that initially, i.e., up to the two week test period, there is no difference in useful gloss polish life between the multi-phase composition and the Turtle Wax product. However, the multi-phase composition is better than the Turtle Wax product in useful gloss polish life at the two week evaluation period and likewise throughout the remainder of the fourteen week test period. Thus, it can be concluded from FIG. 1 that the multi-phase paste polish composition is better in gloss retention than the Turtle Wax paste polish product. The actual average evaluator gloss ratings for the multi-phase polish compositions Product X, Product T, and the Turtel Wax product are given below in Table 2.

TABLE 2

| | Average Evaluator Gloss Ratings vs. Clean Paint (Cleaned-Only Controls) | | |
|---|---|---|---|
| Test Period | Product X | Product T | Turtle Wax Paste |
| Initial | 1.59 | 1.57 | 1.57 |
| 2 weeks | 0.82 | 0.94 | 0.79 |
| 4 weeks | 0.84 | 0.87 | 0.58 |
| 6 weeks | 0.75 | 0.78 | 0.42 |
| 8 weeks | 0.69 | 0.66 | 0.44 |
| 10 weeks | 0.60 | 0.54 | 0.37 |
| 14 weeks | 0.43 | 0.47 | 0.20 |

Figure 2:
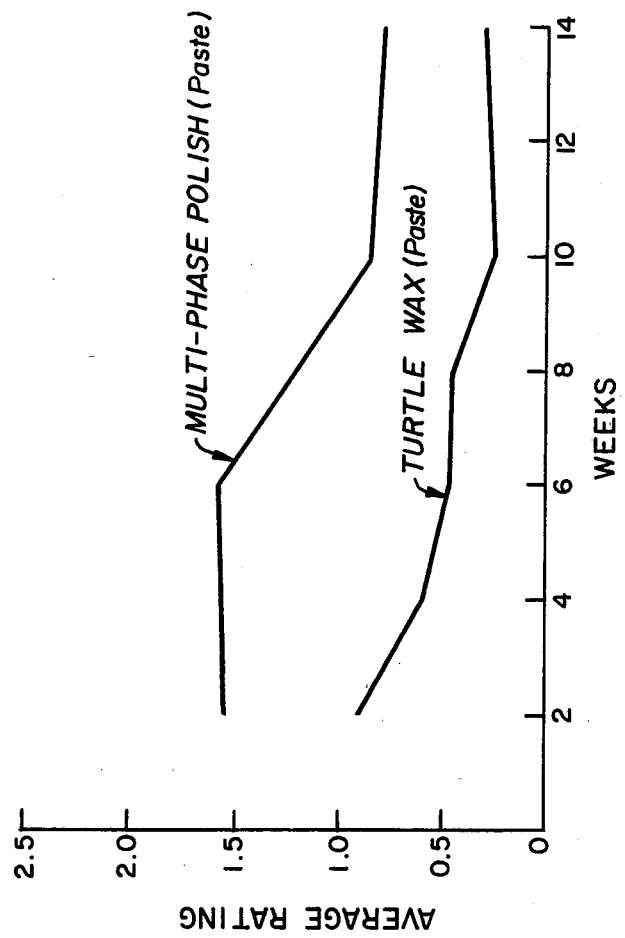
FIG. 2 is a graphic representation of the improved water beading durability of a polish composition of the present invention compared with the prior art.

The average evaluator water beading ratings for the multi-phase paste polish composition Product X and the Turtle Wax paste polish product are shown graphically in FIG. 2. It can be seen from FIG. 2 that the average evaluator water beading ratings for the multi-phase polish composition were well above 0.5 throughout the fourteen week test period. In comparison, it can be seen from FIG. 2 that the average evaluator water beading ratings for Turtle Wax Paste fall below 0.5 at the six week test period, and remain below 0.5 throughout the rest of the fourteen week test period. Therefore, it may be concluded from the foregoing test results that the multi-phase polish composition has a useful polish water beading life in excess of fourteen weeks, whereas the useful polish water beading life of Turtle Wax paste polish is approximately six weeks, that is, a useful water beading life that is twice as long as the Turtle Wax product. It can also be seen from FIG. 2 that the multi-phase composition is better than the Turtle Wax product in water beading throughout the fourteen week test period, and significantly, that the Turtle Wax product rapidly and steadily loses its water beading property during the initial four week test period, whereas the multi-phase polish composition completely retains its water beading property for the initial six week test period. Thus, it may be concluded that the multi-phase paste polish composition of this invention has a significantly better useful water beading life than Turtle Wax paste polish. The actual average evaluator water beading ratings for the multi-phase polish compositions Product X, Product T, and the Turtle Wax product are given in Table 3. As can be seen from FIG. 2, no initial water beading ratings are made in this evaluation.

TABLE 3

Average Evaluator Water Beading Ratings vs. Clean Paint (Cleaned-Only Controls)

| Test Period | Product X | Product T | Turtle Wax Paste |
|---|---|---|---|
| 2 weeks | 1.54 | 1.55 | 0.91 |
| 4 weeks | 1.55 | 1.38 | 0.59 |
| 6 weeks | 1.57 | 1.54 | 0.46 |
| 8 weeks | 1.20 | 1.17 | 0.44 |
| 10 weeks | 0.84 | 0.93 | 0.25 |
| 14 weeks | 0.78 | 0.75 | 0.31 |

EXAMPLE III

A single phase paste polish Product A was prepared from the following composition:

| Paste Product A | |
|---|---|
| Ingredient | %/Weight |
| Aliphatic hydrocarbon | 40.00 |
| Dimethyl polysiloxane, low viscosity | 6.66 |
| Dimethyl polysiloxane, high viscosity | 1.00 |
| Aminofunctional polysiloxane | 3.60 |
| Montan wax | 3.81 |
| Carnauba wax | 1.19 |
| Oleic acid | 1.20 |
| Soft water | 24.14 |
| Abrasive | 17.00 |
| Morpholine | 1.20 |
| Aromatic oil | 0.20 |
| | 100.00 |

Paste Product A represents a typical "durable" paste wax composition containing aminofunctional polysiloxane and dimethyl polysiloxanes. In preparing Paste Product A, all the wax and silicone components were dissolved together in the aliphatic hydrocarbon during production in accordance with conventional practice.

A multi-phase paste polish Product B was prepared from the above composition, except that two separate polish phases were prepared separately and added to a container as separate components. One polish phase contained twice the designated formula amount of dimethyl polysiloxane, i.e., 15.32%, but no aminofunctional polysiloxane. The other polish phase contained twice the designated formula amount of aminofunctional polysiloxane, i.e., 7.2%, but no dimethyl polysiloxane. Each polish phase comprised one-half of Product B in the container.

Product A and Product B were evaluated for ease of application, ease of rub-off, and short-term water resistance. Short-term water resistance is evaluated after spraying the polished surface with water within hours of applying the polish product. The comparative evaluation results are shown below in Table 4 with ratings given being on a scale of 1 to 5, with 5 being the best value.

TABLE 4

| Paste Polish | Ease of Application | Ease of Rub-Off | Short-Term Water Resistance |
|---|---|---|---|
| Product A | 2.7 | 3.0 | 3.0 |
| Product B | 3.2 | 3.1 | 3.3 |

From the results in Table 4, it can be seen that the multi-phase polish composition (Product B) provides improved ease of application and short-term water resistance without altering the total composition of the single phase product (Product A).

EXAMPLE IV

A single phase paste polish Product C was prepared from the following composition.

| Paste Product C | |
|---|---|
| Ingredient | %/Weight |
| Aliphatic hydrocarbon | 40.00 |
| Dimethyl polysiloxane, low viscosity | 3.48 |
| Dimethyl polysiloxane, high viscosity | 0.52 |
| Aminofunctional polysiloxane | 3.60 |
| Montan wax | 3.81 |
| Carnauba wax | 1.19 |
| Oleic acid | 1.20 |
| Soft water | 27.80 |
| Abrasive | 17.00 |
| Morpholine | 1.20 |
| Aromatic oil | 0.20 |
| | 100.00 |

Paste Product C represents a typical "durable" paste wax composition containing a high content of aminofunctional polysiloxane, but a reduced content of dimethyl polysiloxane in an attempt to improve short-term water resistance properties. In preparing past Product C, all the wax and silicone components were dissolved together in the aliphatic hydrocarbon during production pursuant to conventional methods.

A multi-phase paste polish Product D was prepared from the above composition, except that two separate polish phases were prepared separately and added to a container as separate components. One polish phase contained twice the designated formula amount of dimethyl polysiloxane, i.e., 8.0%, but no aminofunctional polysiloxane. The other polish paste contained twice the designated formula amount of aminofunctional polysiloxane, i.e., 7.2%, but no dimethyl polysiloxane.

Each polish phase comprised one-half of Product D in the container.

Product C and Product D were evaluated for ease of application, ease of rub-off, and short-term water resistance. The comparative evaluation results are shown below in Table 5 with ratings for ease of application and ease of rub-off given being on a scale of 1 to 5, with 5 being the best value. The values for water resistance are a ranking with higher values being better.

TABLE 5

| Paste Polish | Ease of Application | Ease of Rub-Off | Short-Term Water Resistance |
|---|---|---|---|
| Product C | 2.9 | 1.9 | 4.0 |
| Product D | 3.3 | 2.6 | 5.3 |

From the results of Table 5, it can be seen that the multi-phase polish composition (Product D) provides improved ease of application and ease of rub-off, as well as short-term water resistance evaluated as in Example III without altering the total composition of the single phase product (Product C).

EXAMPLE V

A single phase paste polish oil external emulsion Product E with very high aminofunctional polysiloxane content and reduced dimethyl polysiloxane content was prepared from the following composition:

| Paste Product E | |
|---|---|
| Ingredient | %/Weight |
| Aliphatic hydrocarbon | 20.00 |
| Aminofunctional polysiloxane | 7.00 |
| Dimethyl polysiloxane, low viscosity | 2.95 |
| Dimethyl polysiloxane, high viscosity | 1.05 |
| Partially saponified, oxidized wax | 1.30 |
| Oxidized, microcrystalline wax | 0.70 |
| Soft water | 48.50 |
| Abrasive | 14.00 |
| Ethylene glycol | 3.00 |
| Stearylamine acetate | 0.60 |
| Amine & 1,2 benzisothiazolin 3-one | 0.10 |
| Morpholine | 0.10 |
| Formalin | 0.10 |
| Sorbitan monostearate | 0.20 |
| Sorbitan monooleate | 0.20 |
| Pigment | 0.10 |
| Aromatic oil | 0.10 |
| | 100.00 |

A single phase paste polish water external emulsion Product F with very high aminofunctional polysiloxane content and reduced dimethyl polysiloxane content was prepared from the following composition:

| Paste Product F | |
|---|---|
| Ingredient | %/Weight |
| Aliphatic hydrocarbon | 37.00 |
| Dimethyl polysiloxane, low viscosity | 2.95 |
| Dimethyl polysiloxane, high viscosity | 1.05 |
| Aminofunctional polysiloxane | 7.00 |
| Montan wax | 5.50 |
| Paraffin wax | 1.00 |
| Oleic acid | 1.20 |
| Soft water | 26.00 |
| Abrasive | 17.00 |
| Morpholine | 1.20 |
| Aromatic oil | 0.10 |
| | 100.00 |

A multi-phase paste polish Product G was prepared from an oil external emulsion phase G-1 containing the aminofunctional polysiloxane, packaged in the same container with a water external emulsion phase G-2 containing the dimethyl polysiloaxne. Oil external emulsion phase G-1 and water external emulsion phase G-2 each comprised one-half of Product G in the container.

| Oil External Emulsion Phase G-1 | |
|---|---|
| Ingredient | %/Weight |
| Aliphatic hydrocarbon | 18.0 |
| Abrasive | 14.0 |
| Paraffin wax | 0.7 |
| Paraffin wax | 1.3 |
| Aminofunctional Polysiloxane | 14.0 |
| Sorbitan monooleate | 0.2 |
| Sorbitan monostearate | 0.2 |
| Stearylamine acetate | 0.6 |
| Soft water | 47.5 |
| Ethylene glycol | 3.0 |
| Amine & 1,2 benzisothiazolin 3-one | 0.1 |
| Morpholine | 0.1 |
| Formalin | 0.1 |
| Pigment | 0.1 |
| Aromatic oil | 0.1 |
| | 100.0 |

The composition of the water emulsion phase G-2 was as follows:

| Water External Emulsion Phase G-2 | |
|---|---|
| Ingredient | %/Weight |
| Aliphatic hydrocarbon | 40.0 |
| Montan wax | 5.5 |
| Paraffin wax | 1.0 |
| Dimethyl polysiloxane, low viscosity | 5.9 |
| Dimethyl polysiloxane, high viscosity | 2.1 |
| Oleic acid | 1.2 |
| Soft water | 26.0 |
| Abrasive | 17.0 |
| Morpholine | 1.2 |
| Aromatic oil | 0.1 |
| | 100.0 |

Product E, Product F, and Product G were evaluated for ease of application, ease of rub-off, and short-term water resistance. The comparative evaluation results are shown below in Table 6 with ratings for ease of application and ease of rub-off given on a scale of 1 to 5, with 5 being the best value. The values for water resistance are a ranking with higher values being better.

TABLE 6

| Paste Polish | Ease of Application | Ease of Rub-Off | Water Resistance | |
|---|---|---|---|---|
| | | | Short-Term | 2 Weeks |
| Product E | 1.7 | 3.4 | 7.7 | 5.7 |
| Product F | 3.3 | 2.0 | 6.7 | 5.8 |
| Product G | 2.8 | 3.1 | 6.3 | 6.8 |

From the results in Table 6, it can be seen that the oil external emulsion Product E is somewhat difficult to apply, but is easy to rub-off. In comparison, Product F is easy to apply, but difficult to rub-off. However, product G is both easy to apply and easy to rub-off. In addition, Product G provides longer lasting water resistance than both Product E and Product F. It can be concluded that processing dimethyl polysiloxane and aminofunctional polysiloxane separately and using them in the most effective emulsion types results in improved application and durability properties over conventional polishes and conventional polish preparation processes.

EXAMPLE VI

A multi-phase liquid polish composition in accordance with this invention was prepared as follows. The oil external emulsion phase was prepared from the following ingredients:

| Oil External Emulsion Phase | | |
|---|---|---|
| Ingredient | | %/Weight |
| (A) | Petroleum hydrocarbon distillate | 23.5 |
| (B) | Aminofunctional polysiloxane | 2.0 |
| (C) | Aminofunctional polysiloxane (aliphatic hydrocarbon solution, 50% active) | 4.0 |
| (D) | Petroleum wax | 2.0 |
| (E) | Sorbitan monooleate | 1.0 |
| (F) | Abrasive | 8.0 |
| (G) | Abrasive | 4.0 |
| (H) | Soft water | 55.2 |
| (I) | Aromatic oil | 0.1 |
| (J) | Formalin | 0.1 |
| (K) | Pigment | 0.1 |
| | | 100.0 |

Two containers equipped with variable speed agitators and suitable for use with a heating device such as a laboratory hot plate were employed to make the water phase preparation and the oil phase preparation, respectively, of the oil external emulsion phase. The water phase preparation was made by adding ingredient H to one container. Agitation was started and heating initiated to 100° F.

The oil phase preparation was prepared by adding ingredient A to the other container. Agitation was started and heating initiated to 200° F. Ingredients B, C, D, and E were added to the container in the recited order. Heating was continued to 200° F., and the mixture kept at that temperature until the ingredients were dissolved or dispersed. Then, in the recited order, ingredients F and G were added to this mixture while maintaining the mixture at about 200° F.

In the emulsification step, the water phase preparation heated to 100° F. was rapidly added to the oil phase preparation with good agitation. Agitator speed was then reduced to maintain slight product movement and the batch cooled at about 140° F. at which time ingredient J was added thereto. When the batch was cooled to about 135° F., ingredient I was added thereto, and when the batch had cooled to about 130° F., ingredient K was added thereto. The batch was maintained at a temperature of about 110° F. The batch may be homogenized if increased stability is desired.

A water external emulsion phase was prepared from the following ingredients:

| Water External Emulsion Phase | | |
|---|---|---|
| Ingredient | | %/Weight |
| (A-1) | Petroleum hydrocarbon distillate | 40.0 |
| (B-1) | Dimethyl polysiloxane, high viscosity | 3.3 |
| (C-1) | Dimethyl polysiloxane, low viscosity | 1.7 |
| (D-1) | Petroleum wax | 2.0 |
| (E-1) | Oleic acid | 2.0 |
| (F-1) | Soft water | 37.9 |
| (G-1) | Abrasive | 4.2 |
| (H-1) | Abrasive | 4.7 |
| (I-1) | Abrasive | 2.2 |

-continued

| Water External Emulsion Phase | | |
|---|---|---|
| Ingredient | | %/Weight |
| (J-1) | Morpholine | 1.0 |
| (K-1) | Perfume | 0.1 |
| (L-1) | Viscosity modifier | 0.7 |
| (M-1) | Viscosity modifier | 0.2 |
| | | 100.0 |

Two containers equipped with variable speed agitators and suitable for use with a heating device such as a hot plate were employed to make the oil phase preparation and the water phase preparation, respectively, of the water external emulsion phase. The water phase preparation was made by adding ingredient F-1 to one container. Agitation was started and heating initiated to 100° F. Ingredients G-1 and H-1 were slowly added to the container, followed by slow addition of ingredient I-1. Ingredient J-1 was added to the container about 10 minutes before emulsification with the oil phase preparation. The oil phase preparation was prepared by adding to the other container, in the recited order, ingredients A-1, B-1, C-1, D-1, and E-1 with continued agitation and heating to about 190° F., then maintaining this temperature for about 10 minutes. The mixture was cooled to about 175° F., at which time it was slowly added to the water phase preparation with continued agitation for about 15 minutes after addition. Ingredient K-1 was added to the mixture, followed by ingredient L-1 with continued agitation, then by ingredient M-1 and agitation continued for about 20 minutes while cooling to about 90° F.

The multi-phase liquid polish composition was then obtained by packaging the oil external emulsion phase and the water external emulsion phase into separate containers having equal-sized dispensers. This product was identified as Product H.

EXAMPLE VII

A multi-phase liquid polish composition in accordance with this invention was prepared as follows. The oil external emulsion phase was prepared from the following ingredients:

| Oil External Emulsion Phase | | |
|---|---|---|
| Ingredient | | %/Weight |
| (A) | Petroleum hydrocarbon distillate | 27.1 |
| (B) | Aminofunctional polysiloxane | 2.0 |
| (C) | Aminofunctional polysiloxane (aliphatic hydrocarbon solution, 50% active) | 6.0 |
| (D) | Petroleum wax | 2.0 |
| (E) | Sorbitan monooleate | 1.0 |
| (F) | Abrasive | 8.0 |
| (G) | Abrasive | 4.0 |
| (H) | Soft water | 49.6 |
| (I) | Aromatic oil | 0.1 |
| (J) | Formalin | 0.1 |
| (K) | Pigment | 0.1 |
| | | 100.0 |

This product was prepared using the procedure described in Example VI for the oil external emulsion phase therein.

A water external emulsion phase was prepared from the following ingredients:

| Water External Emulsion Phase | | |
|---|---|---|
| Ingredient | | %/Weight |
| (A-1) | Petroleum hydrocarbon distillate | 40.0 |
| (B-1) | Dimethyl polysiloxane, high viscosity | 3.3 |
| (C-1) | Dimethyl polysiloxane, low viscosity | 1.7 |
| (D-1) | Petroleum wax | 2.0 |
| (E-1) | Oleic acid | 2.0 |
| (F-1) | Soft water | 37.9 |
| (G-1) | Abrasive | 4.2 |
| (H-1) | Abrasive | 4.7 |
| (I-1) | Abrasive | 2.2 |
| (J-1) | Morpholine | 1.0 |
| (K-1) | Perfume | 0.1 |
| (L-1) | Viscosity modifier | 0.7 |
| (M-1) | Viscosity modifier | 0.2 |
| | | 100.0 |

This product was prepared using the procedure described in Example VI for the water external emulsion phase therein.

The multi-phase liquid polish composition was packaged as in Example VI and identified as Product I.

EXAMPLE VIII

A multi-phase liquid polish composition in accordance with this invention was prepared as follows. The oil external emulsion phase was prepared from the following ingredients:

| Oil External Emulsion Phase | | |
|---|---|---|
| Ingredient | | %/Weight |
| (A) | Petroleum hydrocarbon distillate | 23.5 |
| (B) | Aminofunctional polysiloxane | 2.0 |
| (C) | Aminofunctional polysiloxane (aliphatic hydrocarbon solution, 50% active) | 4.0 |
| (D) | Petroleum wax | 2.0 |
| (E) | Sorbitan monooleate | 1.0 |
| (F) | Abrasive | 8.0 |
| (G) | Abrasive | 4.0 |
| (H) | Soft water | 55.2 |
| (I) | Aromatic oil | 0.1 |
| (J) | Formalin | 0.1 |
| (K) | Pigment | 0.1 |
| | | 100.0 |

This product was prepared using the procedure described in Example VI for the oil external emulsion phase therein.

A water external emulsion phase was prepared from the following ingredients:

| Water External Emulsion Phase | | |
|---|---|---|
| Ingredient | | %/Weight |
| (A-1) | Petroleum hydrocarbon distillate | 40.0 |
| (B-1) | Dimethyl polysiloxane, high viscosity | 4.0 |
| (C-1) | Dimethyl polysiloxane, low viscosity | 1.0 |
| (D-1) | Paraffin | 1.5 |
| (E-1) | Petroleum wax | 2.0 |
| (F-1) | Oleic acid | 2.0 |
| (G-1) | Soft water | 36.4 |
| (H-1) | Abrasive | 4.2 |
| (I-1) | Abrasive | 4.7 |
| (J-1) | Abrasive | 2.2 |
| (K-1) | Morpholine | 1.0 |
| (L-1) | Perfume | 0.1 |
| (M-1) | Viscosity modifier | 0.7 |
| (N-1) | Viscosity modifier | 0.2 |
| | | 100.0 |

This product was prepared using the procedure described in Example VI for the water external emulsion phase therein.

The multi-phase liquid polish composition was packaged as in Example VI and identified as Product J.

EXAMPLE IX

The three multi-phase liquid polish compositions obtained pursuant to Examples VI, VII, and VIII were evaluated against a commercial liquid polish composition available from Turtle Wax Company, Chicago, Ill. under the tradename Turtle Wax ® High Gloss Car Wax, stock no T-123, for water beading retention, gloss, and polish life. Turtle Wax High Gloss Car Wax (Turtle Wax Liquid) is believed to be a single phase, water extendable liquid wax which is a recognized leader in the field of automotive wax products. The comparative evaluation was conducted in the State of New York during the months of June and of July, 1984 on fifteen automobiles. Data was accumulated at the start of the comparative evaluation, and at two week intervals for 4 weeks, and at the end of 7 weeks. Each liquid polish product was evaluated on each automobile. The evaluations were conducted on the mainly horizontal surfaces of the automobiles because experience has shown that exposure to sunlight, rain, and atmospheric fallout causes more severe weathering on these horizontal surfaces. In addition, gloss and water beading are normally determined by observation of the horizontal surfaces of automobiles.

The automobiles employed in the comparative evaluation were selected to represent a variety of manufacturers, ages, colors, and paint conditions. Both metallic and non-metallic paints were included in the evaluation. All automobiles were used to commute to and from the owner's place of employment. Nine of the automobiles were not garaged during the night. One automobile was garaged about ½ of the time. The test automobiles ranged in age from 1977 to 1983 models as shown below in Table 7.

TABLE 7

| | | | Paste Polish Compositions Test Automobiles | | | |
|---|---|---|---|---|---|---|
| Model | Year | Color | Paint Type | Garaged | Initial Finish Condition | Odometer Reading |
| Oldsmobile Omega | 1981 | Blue | Metallic | No | Good, slightly dull | 24,422 |
| Chevrolet Citation | 1981 | Red | Metallic | Yes | Moderately dull and oxidized | 39,366 |
| Datsun 310 | 1979 | Beige | Non-metallic | No | Very dull and oxidized | 88,087 |
| Chevrolet Citation | 1980 | Blue | Metallic | No | Good, slightly dull | 75,627 |
| Nissan Sentra | 1982 | Maroon | Metallic | No | Good, moderately dull | 32,443 |

TABLE 7-continued

| | | | Paste Polish Compositions Test Automobiles | | | |
|---|---|---|---|---|---|---|
| Model | Year | Color | Paint Type | Garaged | Initial Finish Condition | Odometer Reading |
| Ford LTD | 1979 | Maroon | Metallic | No | Slightly dull and oxidized | 83,768 |
| Buick Regal | 1983 | Brown | Metallic | Yes | Good, slightly dull | 18,477 |
| Plymouth Horizon | 1979 | Green | Metallic | No | Slightly dull | 31,683 |
| Pontiac Sunbird | 1980 | Maroon | Metallic | No | Moderately weathered | 39,978 |
| Plymouth Reliant K | 1981 | Green | Metallic | Yes | Moderately oxidized | 39,275 |
| Mercury Monarch | 1978 | Maroon | Non-metallic | One half time | Moderately dull and oxidized | 58,440 |
| Ford LTD II | 1977 | Green | Metallic | Yes | Very dull and oxidized | 68,846 |
| Pontiac Phoenix | 1980 | Navy Blue | Metallic | No | Slightly dull | 38,481 |
| Ford Mustang | 1980 | Grey | Metallic | No | Moderately dull | 51,004 |
| Datsun 310 | 1980 | Red | Metallic | Yes | Moderately dull | 128,249 |

The test liquid polish composition application procedure was as described in Example II wherein each test automobile was washed, rinsed, and dried. The test multi-phase liquid polish compositions were applied in equal proportions to the test automobiles in an array utilizing the partially balanced, incomplete block design described in Example II. The Turtle Wax Liquid polish was applied to the test automobiles according to directions printed on its container. The test multi-phase liquid polish compositions identified as Product H, Product I, and Product J were applied to the test automobiles in a shaded area. Scoring results were reported following the rating system described in Example II.

The test liquid polishes were all easy to apply to all the test automobiles. The test polishes were also easy to remove from, i.e., rub-off, all the test automobiles. It was found that the test polishes cleaned and improved the appearance of all of the test automobile finishes, and all the polished areas were more shiny than the unpolished surrounding areas.

Figure 3:
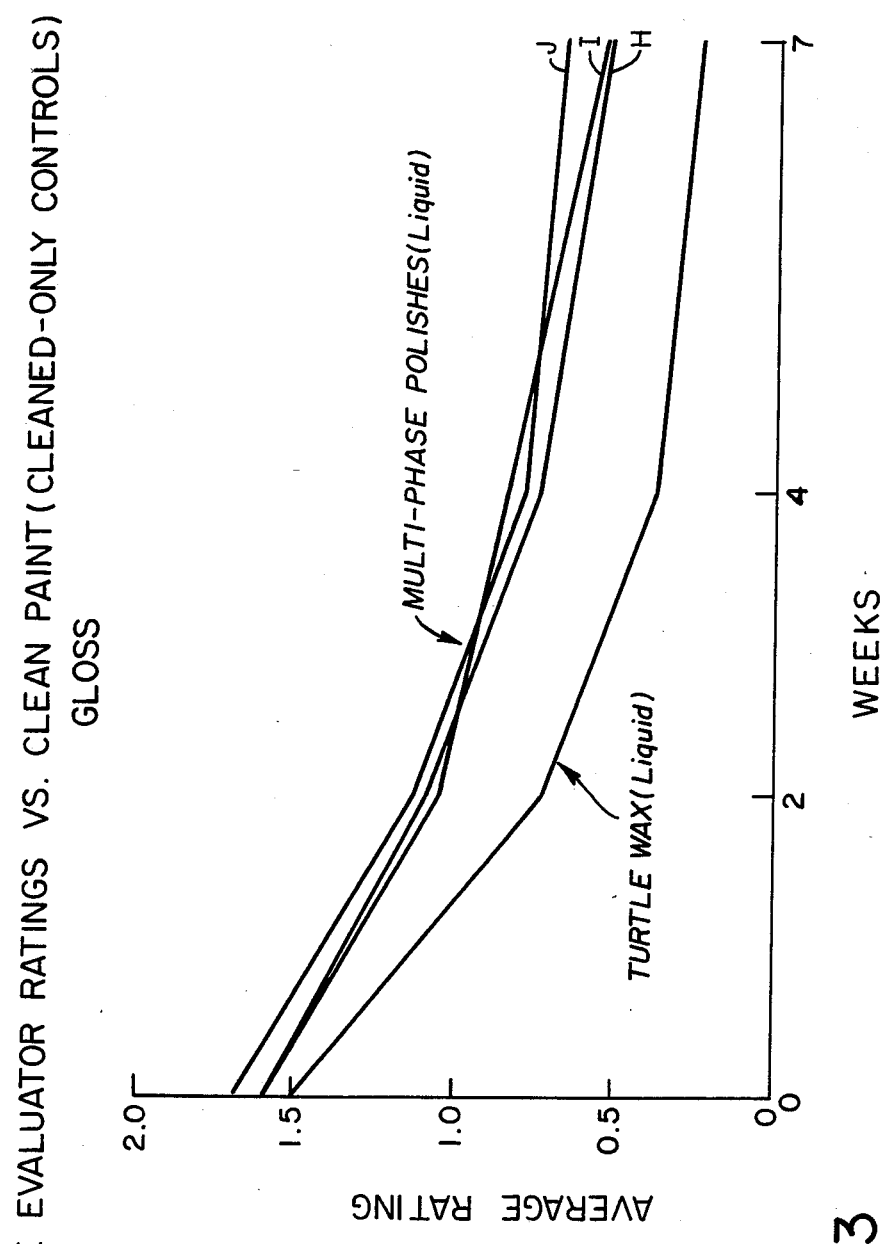
FIG. 3 is a graphic representation of the improved gloss ratings of a polish composition of the present invention compared with the prior art.

Statistical analyses at a 95% confidence level were also made of the direct comparison of the three multi-phase liquid polish compositions herein versus the Turtle Wax Liquid polish. The average evaluator gloss ratings for the multi-phase liquid polish compositions, i.e., Product H, Product I, and Product J, and the Turtle Wax Liquid polish are shown in graphic form in FIG. 3. It can be seen from FIG. 3 that the average evaluator gloss ratings for the multi-phase liquid polish compositions were above 0.5 through the seven week test period, thus indicating that these polish compositions have a useful polish gloss life in excess of seven weeks. By comparison, it can also be seen from FIG. 3 that the average evaluator gloss ratings for Turtle Wax Liquid Polish fall below 0.5 prior to the four week test period, and remain below 0.5 throughout the rest of the seven week test period. Thus, it may be concluded from the foregoing test results that the multi-phase liquid polish compositions have a useful gloss life in excess of seven weeks, whereas Turtle Wax Liquid polish has a useful polish gloss life of less than 3½ weeks, or about twice as long as the Turtle Wax product. It can also be seen from FIG. 3 that initially, i.e., up to the two week test period, there is no difference in useful gloss polish life between the multi-phase liquid polish compositions and Turtle Wax Liquid polish. However, the multi-phase liquid compositions are better than the Turtle Wax liquid composition in useful gloss polish life at the two week evaluation period and likewise throughout the remainder of the seven week test period. Thus, it can be concluded from FIG. 3 that the multi-phase liquid polish compositions are better in gloss retention than the Turtle Wax liquid polish product. The actual average evaluator gloss ratings for the multi-phase polish composition and the Turtle Wax product are given below in Table 8.

TABLE 8

| | Average Evaluator Gloss Ratings vs. Clean Paint (Cleaned-Only Controls) | | | |
|---|---|---|---|---|
| Test Period | Multi-Phase Liquid Polishes | | | Turtle Wax Liquid Polish |
| | Product H | Product I | Product J | |
| Initial | 1.58 | 1.59 | 1.69 | 1.47 |
| 2 Weeks | 1.07 | 1.05 | 1.14 | 0.77 |
| 4 Weeks | 0.74 | 0.84 | 0.79 | 0.37 |
| 7 Weeks | 0.51 | 0.54 | 0.67 | 0.25 |

Figure 4:
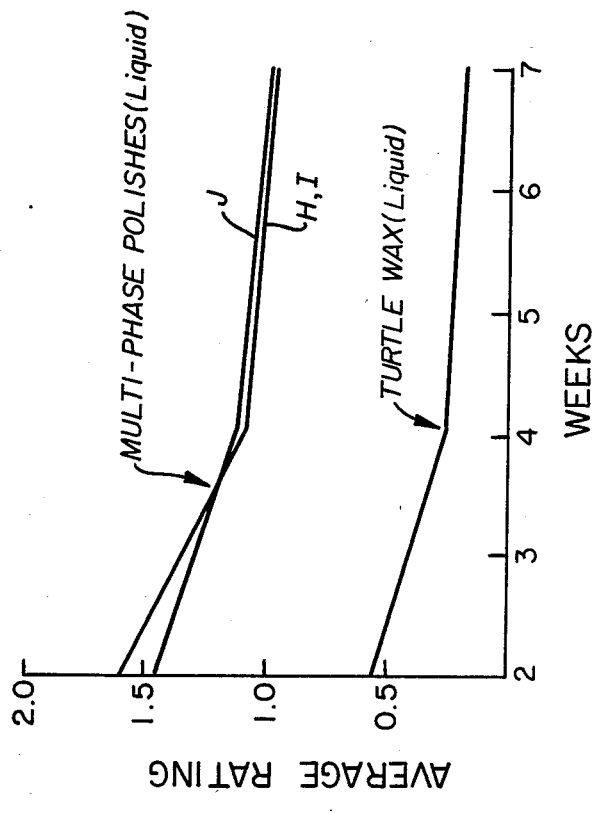
FIG. 4 is a graphic representation of the improved water beading durability of a polish composition of the present invention compared with the prior art.

The average evaluator water beading ratings for the multi-phase liquid polish compositions and the Turtle Wax Liquid polish product are shown graphically in FIG. 4. It can be seen from FIG. 4 that the average evaluator water beading ratings for the multi-phase liquid polish compositions were well above 0.5 throughout the seven week test period. In comparison, it can be seen from FIG. 4 that the average evaluator water beading ratings for Turtle Wax Liquid polish fall below 0.5 at about the three week test period, and remain below 0.5 throughout the rest of the seven week test period. Therefore, it may be concluded from the foregoing test results that the multi-phase liquid polish compositions have a useful polish water beading life in excess of seven weeks, whereas the useful polish water beading life of Turtle Wax Liquid polish is approximately three weeks, or about twice as long as the Turtle Wax product. It can also be seen from FIG. 4 that the multi-phase compositions are better than the Turtle Wax product in water beading throughout the seven week test period. Thus, it may be concluded that the multi-phase liquid polish compositions of this invention have a significantly better useful water beading life than Turtle Wax Liquid polish. The actual average evaluator water beading ratings for the multi-phase liquid polish compositions and the Turtle Wax liquid product are given in Table 9. As can be seen from FIG. 4, no initial water beading ratings are made in this evaluation.

TABLE 9

| | Average Evaluator Water Beading Ratings vs. Clean Paint (Cleaned-Only Controls) | | | |
|---|---|---|---|---|
| Test Period | Multi-Phase Liquid Polishes | | | Turtle Wax Liquid Polish |
| | Product H | Product I | Product J | |
| 2 Weeks | 1.60 | 1.58 | 1.44 | 0.56 |

TABLE 9-continued

| | Average Evaluator Water Beading Ratings vs. Clean Paint (Cleaned-Only Controls) | | | |
|---|---|---|---|---|
| Test | Multi-Phase Liquid Polishes | | | Turtle Wax |
| Period | Product H | Product I | Product J | Liquid Polish |
| 4 Weeks | 1.09 | 1.09 | 1.12 | 0.26 |
| 7 Weeks | 0.95 | 0.96 | 1.02 | 0.17 |

Although preferred embodiments of this invention have been described in detail, it is contemplated that modifications thereof may be made and that some features may be employed without others, all within the spirit and scope of the invention. For example, other ingredients such as ultra-violet light absorbers more commonly known as sun screens may be included in the aforementioned polish compositions. In addition, fluorinated hydrocarbons, such as Teflon ®, may be included in the polish compositions to improve ease of application and ease of rub-off thereof, and the water beading properties of the polished film. Likewise, other polish phase compositions may be present in the multi-phase polish compositions of this invention to provide further desirable characteristics thereto.

What is claimed is:

1. A multi-phase polish composition comprising: (a) an oil external emulsion phase comprising aminofunctional polysiloxane, finely-divided abrasive, petroleum distillate, water, emulsifier, stabilizer, preservative, but excluding dimethyl polysiloxane from said oil external emulsion phase; and, (b) a water external emulsion phase comprising dimethyl polysiloxane, wax, finely-divided abrasive, organic solvent, water, emulsifier, preservative, but excluding aminofunctional polysiloxane from said water external emulsion phase; said oil external emulsion phase and said water external emulsion phase being packaged in the same container in a manner such that said oil external emulsion phase and said water external emulsion phase are separate from each other until use; said multi-phase polish composition being characterized as providing long-lasting gloss and water beading properties when applied to a surface to be polished.

2. A multi-phase polish composition in accordance with claim 1 wherein said oil external emulsion phase comprises from between about 1 and about 10 percent by weight of wax, from between 2 and about 12 percent by weight of aminofunctional silicone oil, from between about 5 and about 30 percent by weight of abrasive, from between about 10 and about 35 percent by weight of petroleum hydrocarbon distillate, from between about 30 and about 75 percent by weight of water, from between about 0.2 and about 6 percent by weight of emulsifier, from between about 0.1 and about 10 percent by weight of stabilizer, and from between about 0.1 and about 1 percent by weight of preservative.

3. A multi-phase polish composition as in accordance with claim 1 wherein said oil external emulsion phase comprises from between about 1 and about 1.5 percent by weight of a partially saponified oxidized hydrocarbon wax, from between about 0.5 and about 1 percent by weight of an oxidized microcrystalline hydrocarbon wax, from between about 1 and about 3 percent by weight of a liquid aminofunctional polysiloxane having a viscosity at 25° C., of from about 10 to about 200 centistokes, and from between about 4 and about 24 percent by weight of a liquid 50 percent by weight aminofunctional polysiloxane having a viscosity at 25° C. of from about 100 to about 5,000 centistokes.

4. A multi-phase polish composition in accordance with claim 1 wherein said finely-divided abrasive in said oil external emulsion phase is selected from the group consisting of silica, diatomaceous earth, kaolin clay, aluminum silicate, and mixtures thereof.

5. A multi-phase polish composition in accordance with claim 1 wherein said emulsifier comprises a fatty acid.

6. A multi-phase polish composition in accordance with claim 1 wherein said stabilizer comprises ethylene glycol.

7. A multi-phase polish composition in accordance with claim 1 wherein said petroleum distillate is selected from volatile aliphatic hydrocarbon liquids having a minimum boiling point of about 300° F.

8. A multi-phase polish composition in accordance with claim 1 wherein said water external emulsion phase comprises from between about 0.1 and about 10 percent by weight of wax, from between about 0.5 and about 15.0 percent by weight of dimethyl polysiloxane, from between about 3 and about 30 percent by weight of abrasive, from between about 0.1 and about 60 percent by weight of organic solvent, from between about 15 and about 95 percent by weight of water, and from between about 0.3 and about 5 percent by weight of emulsifier.

9. A multi-phase polish composition in accordance with claim 8 wherein said water external emulsion phase comprises from between about 0.5 and about 3 percent by weight of paraffin wax having a melting point of about 130° F., from between about 1 and about 10 percent by weight of a montan wax or combination of oxidized montan waxes, and from between about 4 and about 12 percent by weight of a dimethyl polysiloxane having a viscosity at 25° C. of from about 100 to about 30,000 centistokes.

10. A multi-phase polish composition in accordance with claim 8 wherein said abrasive is selected from the group consisting of amorphous silica, aluminum silicate, kaolin clay, and mixtures thereof.

11. A multi-phase polish composition in accordance with claim 8 wherein said organic solvent is selected from the group consisting of kerosene and mineral spirits.

12. A multi-phase polish composition in accordance with claim 8 wherein said emulsifier comprises the reaction product of morpholine and a fatty acid.

13. A multi-phase polish composition in accordance with claim 1 wherein said composition is a paste.

14. A multi-phase polish composition in accordance with claim 1 wherein said composition is a liquid.

15. A multi-phase polish composition in accordance with claim 1 wherein said oil external emulsion phase is a water external emulsion phase.

16. A multi-phase polish composition in accordance with claim 1 wherein said water external emulsion phase is an oil external emulsion phase.

17. The method producing a multi-phase polish composition comprising: (a) preparing an oil external emulsion phase comprising aminofunctional polysiloxane, finely-divided abrasive, petroleum distillate, water, emulsifier, stabilizer, preservation, but excluding dimethyl polysiloxane from said oil external emulsion phase; (b) preparing a water external emulsion phase comprising dimethyl polysiloxane, wax, finely-divided abrasive, organic solvent, water, emulsifier, preservative, but excluding aminofunctional polysiloxane from said water external emulsion phase; and (c) packing said oil external emulsion phase and said water external phase in the same container in a manner such that said oil external emulsion phase and said water external emulsion phase are separate from each other until use; said multi-phase polish composition being characterized as providing long-lasting gloss and water beading properties when applied to a surface to be polished.

18. The method of producing a multi-phase polish composition in accordance with claim 17 wherein said oil external emulsion phase comprises from between about 1 and about 10 percent by weight of wax, from between 2 and about 12 percent by weight of aminofunctional silicone oil, from between about 5 and about 30 percent by weight of abrasive, from between about 10 and about 35 percent by weight of petroleum hydrocarbon distillate, from between about 30 and about 75 percent by weight of water, from between about 0.2 and about 6 percent by weight of emulsifier, from between about 0.1 and about 10 percent by weight of stabilizer, and from between about 0.1 and about 1 percent by weight of preservative.

19. The method of producing a multi-phase polish composition as in accordance with claim 17 wherein said oil external emulsion phase comprises from between about 1 and about 1.5 percent by weight of a partially saponified oxidized hydrocarbon wax, from between about 0.5 and about 1 percent by weight of an oxidized microcrystalline hydrocarbon wax, from between about 1 and about 3 percent by weight of a liquid aminofunctional polysiloxane having a viscosity at 25° C., of from about 10 to about 200 centistokes, and from between about 4 and about 24 percent by weight of a liquid 50% by weight aminofunctional polysiloxane having a viscosity at 25° C. of from about 100 to about 5,000 centistokes.

20. The method of producing a multi-phase polish composition in accordance with claim 17 wherein said finely-divided abrasive in said oil external emulsion phase is selected from the group consisting of silica, diatomaceous earth, kaolin clay, aluminum silicate, and mixtures thereof.

21. The method of producing a multi-phase polish composition in accordance with claim 17 wherein said emulsifier comprises a fatty acid.

22. The method of producing a multi-phase polish composition in accordance with claim 17 wherein said stabilizer comprises ethylene glycol.

23. The method of producing a multi-phase polish composition in accordance with claim 17 wherein said petroleum distillate is selected from volatile aliphatic hydrocarbon liquids having a minimum boiling point of about 300° F.

24. The method of producing a multi-phase polish composition in accordance with claim 17 wherein said water external emulsion phase comprises from between about 0.1 and about 10 percent by weight of wax, from between about 0.5 and about 15.0 percent by weight of dimethyl polysiloxane, from between about 3 and about 30 percent by weight of abrasive, from between about 0.1 and about 60 percent by weight of organic solvent, from between about 15 and about 95 percent by weight of water, and from between about 0.3 and about 5 percent by weight of emulsifier.

25. The method of producing a multi-phase polish composition in accordance with claim 24 wherein said water external emulsion phase comprises from between about 0.5 and about 3 percent by weight of paraffin wax having a melting point of about 130° F., from between about 1 and about 10 percent by weight of a montan wax or combination of oxidized montan waxes, and from between about 4 and about 12 percent by weight of a dimethyl polysiloxane having a viscosity at 25° C. of from about 100 to about 30,00 centistokes.

26. The method of producing a multi-phase polish composition in accordance with claim 24 wherein said abrasive is selected from the group consisting of amorphous silica, aluminum silicate, kaolin clay, and mixtures thereof.

27. The method of producing a multi-phase polish composition in accordance with claim 24 wherein said organic solvent is selected from the group consisting of kerosene and mineral spirits.

28. The method of producing a multi-phase polish composition in accordance with claim 24 wherein said emulsifier comprises the reaction product of morpholine and a fatty acid.

29. The method of producing a multi-phase polish composition in accordance with claim 17 including solidifying said oil external emulsion phase and said water external emulsion phase into a paste.

30. The method of producing a multi-phase polish composition in accordance with claim 17 including keeping said oil external emulsion phase and said water external emulsion phase separate from each other until use by adding said oil external emulsion phase and said water external emulsion phase in consecutive layers to a container.

31. The method of producing a multi-phase polish composition in accordance with claim 17 including keeping said oil external emulsion phase and said water external emulsion phase separate from each other until use by adding said oil external emulsion phase to a container in a crisscross pattern with respect to said water external emulsion phase added to a container.

32. The method of producing a multi-phase polish composition in accordance with claim 17 including keeping said oil external emulsion phase and said water external emulsion phase separate from each other until use by adding said oil external emulsion phase and said water external emulsion phase to a container in adjacent layers.

33. The method of producing a multi-phase polish composition in accordance with claim 17 including preparing said oil external emulsion by:
(a) adding said water to a first container equipped with an agitator,
(b) adding said stabilizer to said container and heating the mixture to about 185° F.,
(c) adding said emulsifier to said container and mixing said mixture,
(d) adding said petroleum distillate to a second container equipped with an agitator,
(e) adding part of said abrasive to said second container,
(f) adding said wax to said second container and heating the mixture to about 200° F. until said wax is dissolved or dispersed,
(g) adding said aminofunctional polysiloxane to said second container,
(h) adding the remainder of said abrasive to said second container,
(i) adding said emulsifier to said second container, (j) heating the mixture in said second container to about 205° F. until the ingredients of said mixture are dissolved or dispersed, (k) agitating the contents of said second container at a speed sufficient to stir said contents, (l) agitating the contents of said first container at a speed sufficient to stir said contents while cooling the contents of said first container to a temperature of about 185° F., (m) adding rapidly the contents of said first container to said second container, (n) agitating the contents of said second container while cooling to about 150° F., and (o) adding said morpholine and said preservative to said second container.

34. The method of producing a multi-phase polish composition in accordance with claim 33 including homogenizing said oil external emulsion phase, and maintaining the oil external emulsion phase at a temperature of about 130° F. prior to mixing with said water external emulsion phase.

35. The method of producing a multi-phase polish composition in accordance with claim 17 including preparing said water external emulsion by:

(a) adding to a first container equipped with an agitator, in order, said organic solvent, said dimethyl polysiloxane, said montan wax, and said paraffin wax, (b) agitating the mixture while heating to a temperature of about 195° F. and maintaining said temperature for about 15 minutes, (c) cooling the mixture to a temperature of about 170° F., (d) adding said emulsifier to the mixture, (e) adding to a second container, in order, said water and said abrasive, (f) agitating the mixture in said second container while heating to a temperature of about 120° F., (g) adding said morpholine to said second container, and (h) adding slowly the contents of said first container to said second container while adjusting the temperature of the mixture to about 140° F.

36. The method of producing a multi-phase polish composition in accordance with claim 17 including preparing said oil external emulsion phase as a water external emulsion phase.

37. The method of producing a multi-phase polish composition in accordance with claim 17 including preparing said water external emulsion phase as an oil external emulsion phase.

38. A process of polishing a surface comprising (a) applying and mixing a multi-phase polish composition on said surface, said polish composition comprising: (1) an oil external emulsion phase comprising aminofunctional polysiloxane, finely-divided abrasive, petroleum distillate, water, emulsifier, stabilizer, preservative, but excluding dimethyl polysiloxane from said oil external emulsion phase; and (2) a water external emulsion phase comprising dimethyl polysiloxane, wax, finely-divided abrasive, organic solvent, water, emulsifier, preservative, but excluding aminofunctional polysiloxane from said water external emulsion phase; said oil external emulsion phase and said water external emulsion phase being packaged in the same container in a manner such that said oil external emulsion phase and said water external emulsion phase are separated from each other until use; and (b) buffing said surface.

39. A process in accordance with claim 38 wherein said oil external emulsion phase comprises from between about 1 and about 10 percent by weight of wax, from between 2 and about 12 percent by weight of aminofunctional silicone oil, from between about 5 and about 30 percent by weight of abrasive, from between about 10 and about 35 percent by weight of petroleum hydrocarbon distillate, from between about 30 and about 75 percent by weight of water, from between about 0.2 and about 6 percent by weight of emulsifier, from between about 0.1 and about 10 percent by weight of stabilizer, and from between about 0.1 and about 1 percent by weight of preservative.

40. A process in accordance with claim 38 wherein said oil external emulsion phase comprises from between about 1 and about 1.5 percent by weight of a partially saponified oxidized hydrocarbon wax, from between about 0.5 and about 1 percent by weight of an oxidized microcrystalline hydrocarbon wax, from between about 1 and about 3 percent by weight of a liquid aminofunctional polysiloxane having a viscosity at 25° C., of from about 10 to about 200 centistokes, and from between about 4 and about 24 percent by weight of a liquid 50 percent by weight aminofunctional polysiloxane having a viscosity at 25° C. of from about 100 to about 5,000 centistokes.

41. A process in accordance with claim 38 wherein said finely-divided abrasive in said oil external emulsion phase is selected from the group consisting of silica, diatomaceous earth, kaolin clay, aluminum silicate, and mixtures thereof.

42. A process in accordance with claim 38 wherein said emulsifier comprises a fatty acid.

43. A process in accordance with claim 38 wherein said stabilizer comprises ethylene glycol.

44. A process in accordance with claim 38 wherein said petroleum distillate is selected from volatile aliphatic hydrocarbon liquids having a minimum boiling point of about 300° F.

45. A process in accordance with claim 38 wherein said water external emulsion phase comprises from between about 0.1 and about 10 percent by weight of wax, from between about 0.5 and about 15.0 percent by weight of dimethyl polysiloxane, from between about 3 and about 30 percent by weight of abrasive, from between about 0.1 and about 60 percent by weight of organic solvent, from between about 15 and about 95 percent by weight of water, and from between about 0.3 and about 5 percent by weight of emulsifier.

46. A process in accordance with claim 45 wherein said water external emulsion phase comprises from between about 0.5 and about 3 percent by weight of paraffin wax having a melting point of about 130° F., from between about 1 and about 10 percent by weight of a montan wax or combination of oxidized montan waxes, and from between about 4 and about 12 percent by weight of a dimethyl polysiloxane having a viscosity at 25° C. of from about 100 to about 30,000 centistokes.

47. A process in accordance with claim 45 wherein said abrasive is selected from the group consisting of amorphous silica, aluminum silicate, kaolin clay, and mixtures thereof.

48. A process in accordance with claim 45 wherein said organic solvent is selected from the group consisting of kerosene and mineral spirits.

49. A process in accordance with claim 45 wherein said emulsifier comprises the reaction product of morpholine and a fatty acid.

50. A process in accordance with claim 38 wherein said composition is a paste.

51. A process in accordance with claim 38 wherein said composition is a liquid.

52. A process in accordance with claim 38 wherein said oil external emulsion phase is a water external emulsion phase.

53. A process in accordance with claim 38 wherein said water external emulsion phase is an oil external emulsion phase.

54. A polish composition applied and mixed on a surface to provide a polish mixture, said polish mixture having been obtained from a multi-phase polish composition comprising: (a) an oil external emulsion phase containing aminofunctional polysiloxane, finely-divided abrasive, petroleum distillate, water, emulsifier, stabilizer, preservative, but excluding dimethyl polysiloxane from said oil external emulsion phase; and, (b) a water external emulsion phase containing dimethyl polysiloxane, wax, finely-divided abrasive, organic solvent, water, emulsifier, preservative, but excluding aminofunctional polysiloxane from said water external emulsion phase; said oil external emulsion phase and said water external emulsion phase having been packaged in the same container in a manner such that said oil external emulsion phase and said water external emulsion phase are separate from each other until use; said mixture being characterized as providing long-lasting gloss and water beading properties to said surface.

55. A polish composition in accordance with claim 54 wherein said oil external emulsion phase comprises from between about 1 and about 10 percent by weight of wax, from between 2 and about 12 percent by weight of aminofunctional silicone oil, from between about 5 and about 30 percent by weight of abrasive, from between about 10 and about 35 percent by weight of petroleum hydrocarbon distillate, from between about 30 and about 75 percent by weight of water, from between about 0.2 and about 6 percent by weight of emulsifier, from between about 0.1 and about 10 percent by weight of stabilizer, and from between about 0.1 and about 1 percent by weight of preservative.

56. A polish composition in accordance with claim 54 wherein said oil external emulsion phase comprises from between about 1 and about 1.5 percent by weight of a partially saponified oxidized hydrocarbon wax, from between about 0.5 and about 1 percent by weight of an oxidized microcrystalline hydrocarbon wax, from between about 1 and about 3 percent by weight of a liquid aminofunctional polysiloxane having a viscosity at 25° C., of from about 10 to about 200 centistokes, and from between about 4 and about 24 percent by weight of a liquid 50 percent by weight aminofunctional polysiloxane having a viscosity at 25° C. of from about 100 to about 5,000 centistokes.

57. A polish composition in accordance with claim 54 wherein said finely-divided abrasive in said oil external emulsion phase is selected from the group consisting of silica, diatomaceous earth, kaolin clay, aluminum silicate, and mixtures thereof.

58. A polish composition in accordance with claim 54 wherein said emulsifier comprises a fatty acid.

59. A polish composition in accordance with claim 54 wherein said stabilizer comprises ethylene glycol.

60. A polish composition in accordance with claim 54 wherein said petroleum distillate is selected from volatile aliphatic hydrocarbon liquids having a minimum boiling point of about 300° F.

61. A polish composition in accordance with claim 54 wherein said water external emulsion phase comprises from between about 0.1 and about 10 percent by weight of wax, from between about 0.5 and about 15.0 percent by weight of dimethyl polysiloxane, from between about 3 and about 30 percent by weight of abrasive, from between about 0.1 and about 60 percent by weight of organic solvent, from between about 15 and about 95 percent by weight of water, and from between about 0.3 and about 5 percent by weight of emulsifier.

62. A polish composition in accordance with claim 61 wherein said water external emulsion phase comprises from between about 0.5 and about 3 percent by weight of paraffin wax having a melting point of about 130° F., from between about 1 and about 10 percent by weight of a montan wax or combination of oxidized montan waxes, and from between about 4 and about 12 percent by weight of a dimethyl polysiloxane having a viscosity at 25° C. of from about 100 to about 30,000 centistokes.

63. A polish composition in accordance with claim 61 wherein said abrasive is selected from the group consisting of amorphous silica, aluminum silicate, kaolin clay, and mixtures thereof.

64. A polish composition in accordance with claim 61 wherein said organic solvent is selected from the group consisting of kerosene and mineral spirits.

65. A polish composition in accordance with claim 61 wherein said emulsifier comprises the reaction product of morpholine and a fatty acid.

66. A polish composition in accordance with claim 54 wherein said composition is a paste.

67. A polish composition in accordance with claim 54 wherein said composition is a liquid.

68. A polish composition in accordance with claim 54 wherein said oil external emulsion phase is a water external emulsion phase.

69. A polish composition in accordance with claim 54 wherein said water external emulsion phase is an oil external emulsion phase.

* * * * *